(12) United States Patent
Polly

(10) Patent No.: US 12,104,527 B2
(45) Date of Patent: *Oct. 1, 2024

(54) GEARED GAS TURBINE ENGINE WITH COMBINED SPRAY BAR AND SCAVENGE COMPONENT

(71) Applicant: RTX Corporation, Farmington, CT (US)

(72) Inventor: Joseph H. Polly, Tolland, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,809

(22) Filed: Mar. 22, 2023

(65) Prior Publication Data
US 2023/0228215 A1    Jul. 20, 2023

Related U.S. Application Data

(63) Continuation of application No. 17/171,266, filed on Feb. 9, 2021, now Pat. No. 11,674,440.

(51) Int. Cl.
*F02C 7/06* (2006.01)
*F01D 25/20* (2006.01)
(Continued)

(52) U.S. Cl.
CPC .............. *F02C 7/06* (2013.01); *F01D 25/20* (2013.01); *F02C 7/36* (2013.01); *F16H 57/0479* (2013.01);
(Continued)

(58) Field of Classification Search
CPC ........ F02C 7/06; F02C 7/36; F05D 2220/323; F05D 2260/40311; F05D 2260/98; F15H 57/0479; F16H 57/046; F01D 25/20
(Continued)

(56) References Cited

U.S. PATENT DOCUMENTS 7,704,178 B2    4/2010   Sheridan et al.
8,777,792 B2    7/2014   Imai et al.
(Continued)

FOREIGN PATENT DOCUMENTS

| EP | 2719927 A1 | 4/2014 |
|---|---|---|
| EP | 3039266 B1 | 11/2017 |
| WO | 2015/031185 A1 | 3/2015 |

OTHER PUBLICATIONS

European Search Report for EP Application No. 22155731.7 dated May 18, 2022.

*Primary Examiner* — Yi-Kai Wang
(74) *Attorney, Agent, or Firm* — Carlson, Gaskey & Olds, P.C.

(57) ABSTRACT

A gear reduction includes a sun gear that engages a plurality of planet gears mounted on a carrier. The planet gears are engaged with a ring gear. The ring gear is fixed against rotation such that rotation of the sun gear causes rotation of the planet gears to cause rotation of the carrier. There are spray bars positioned circumferentially between adjacent ones of the planet gears. The spray bars have jet openings, such that lubricant can be passed directly onto teeth on the sun gear. One of the side faces has a plurality of windows such that oil can be scavenged. There are side surfaces between plurality of windows that do not have an opening. A gas turbine engine and a spray bar are also disclosed.

9 Claims, 7 Drawing Sheets

(51) Int. Cl.
  *F02C 7/36* (2006.01)
  *F16H 57/04* (2010.01)
(52) U.S. Cl.
  CPC ............... *F05D 2220/323* (2013.01); *F05D 2260/40311* (2013.01); *F05D 2260/98* (2013.01); *F16H 57/046* (2013.01)
(58) Field of Classification Search
  USPC ...................................... 415/122.1
  See application file for complete search history.

(56) References Cited

U.S. PATENT DOCUMENTS

| | | | |
|---|---|---|---|
| 9,121,491 B2 | 9/2015 | Hancox | |
| 9,759,309 B2 | 9/2017 | Sheridan et al. | |
| 10,202,902 B2 | 2/2019 | McCune et al. | |
| 10,859,155 B2 | 12/2020 | Clark et al. | |
| 2015/0065285 A1* | 3/2015 | McCune | F16H 57/0482 |
| | | | 475/159 |
| 2019/0195140 A1* | 6/2019 | Sheridan | F01D 25/18 |
| 2019/0271385 A1 | 9/2019 | Baraggia Au Yeung et al. | |
| 2019/0376596 A1* | 12/2019 | Clark | F16H 57/0427 |
| 2021/0079844 A1* | 3/2021 | Charrier | F16H 57/0479 |

* cited by examiner

GEARED GAS TURBINE ENGINE WITH COMBINED SPRAY BAR AND SCAVENGE COMPONENT

CROSS-REFERENCE TO RELATED APPLICATIONS Zone Name: A1,AMD

This application is a continuation of U.S. patent application No. 17/171,266 filed on Feb. 9, 2021, now U.S. Pat. No. 11,674,440granted Jun. 13, 2023.

BACKGROUND OF THE INVENTION

This application relates to a spray bar for supplying oil to an interface between a sun gear and a planet gear in a geared turbofan, wherein the spray bar also performs a scavenge function to remove the oil for other uses.

Gas turbine engines are known, and typically include a fan delivering air into a bypass duct for propulsion. The fan also delivers air into a core engine, and in particular into a compressor section. Air is compressed in the compressor section and delivered into a combustor where it is mixed with fuel and ignited. Products of this combustion pass downstream over turbine rotors, driving them to rotate. The turbine rotors in turn drive compressor and fan rotors.

Historically a fan drive turbine has driven a low pressure compressor and the fan rotor at a common speed. However, more recently, a gear reduction has been included between the fan rotor and a shaft driven by the fan drive turbine such that the fan rotor can rotate at a slower speed than the low pressure compressor rotor. Such gear reductions require lubrication. The current commercial geared gas turbine engine utilizes a star gear system as the gear reduction. In a star gear system a sun gear drives a plurality of star gears which are mounted on a carrier. The star gears engage a ring gear. The carrier is fixed and the ring gear rotates, to in turn rotate the fan rotor. Lubricant is supplied through spray bars mounted on the carrier.

Another type gear reduction is a planet gear system. With a planet gear system the carrier rotates along with the planet gear, while the ring gear remains fixed. Supplying oil to the rotating carrier raises challenges.

SUMMARY OF THE INVENTION

In a featured embodiment, a gear reduction for use in a gas turbine engine includes a sun gear. The sun gear has teeth at an outer periphery. The sun gear engages a plurality of planet gears having teeth at an outer periphery. The planet gears are mounted on a carrier, such that the planet gears can rotate in a first direction when driven by the sun gear which rotates in a second direction opposed to the first direction. The planet gears are engaged with teeth on an inner periphery of a ring gear. The ring gear is fixed against rotation such that rotation of the sun gear in the second direction causes rotation of the planet gears in the first direction to in turn cause rotation of the carrier. There are spray bars positioned circumferentially between adjacent ones of the planet gears, with the circumferential directions defined about a central axis of the sun gear. A radially inner face of the spray bars have jet openings communicating with an inlet plenum, such that lubricant can be passed outwardly of the jet openings from the inlet plenum and directly onto the teeth on the sun gear. A pair of side faces on sides of the radially inner face and one of the side faces have a plurality of windows extending from the one of the side faces into a discharge plenum within the spray bar such that oil can be scavenged through the windows into the discharge plenum. There are side surfaces formed between spaced ones of the plurality of windows wherein the side surfaces do not have an opening to communicate with the discharge plenum.

In another embodiment according to the previous embodiment, the radially inner face is contoured about a rotational axis of the sun gear, and the side faces are both contoured about a rotational axis of different ones of the planet gears.

In another embodiment according to any of the previous embodiments, the at least one of the side faces have a radially innermost extent. The plurality of windows have a radially innermost extent. The window radially innermost extents are spaced radially outwardly of the side face radially innermost extent.

In another embodiment according to any of the previous embodiments, the plurality of windows extending from the one of the side faces in a direction with a component which will be radially outward and in a direction that will have a component in a radially outward direction and with a circumferential direction spaced in the direction of rotation with an associated gear once the spray bar is in a gear reduction.

In another embodiment according to any of the previous embodiments, the at least one of the side faces having the contoured surface initially extending in a direction with a circumferential component in a first circumferential direction from the radially innermost extent. The radially innermost extent of the window being at a radial location beyond a point of inflection where the at least one of the side faces begins to extend in a direction having a circumferential component in an opposed circumferential direction the first circumferential direction. The circumferential direction is defined relative to the rotational axis of the sun gear.

In another embodiment according to any of the previous embodiments, the at least one of the side faces have a radially innermost extent. The plurality of windows have a radially innermost extent. The window radially innermost extent is spaced radially outwardly of the side face radially innermost extent.

In another embodiment according to any of the previous embodiments, the plurality of windows extending from the one of the side faces in a direction with a component which will be radially outward and in a direction that will have a component in a radially outward direction and with a circumferential direction spaced in the direction of rotation with an associated gear once the spray bar is in a gear reduction.

In another embodiment according to any of the previous embodiments, the at least one of the side faces have a surface contoured about a rotational axis of one of the planet gears, and initially extending in a direction with a circumferential component in a first circumferential direction from the radially innermost extent. The radially innermost extent of the window is at a radial location beyond a point of inflection where the at least one of the side faces begins to extend in a direction having a circumferential component in an opposed circumferential direction opposed to the first circumferential direction. The circumferential direction is defined relative to a rotational axis of the sun gear.

In another featured embodiment, a gas turbine engine includes a turbine section including a fan drive turbine. A compressor section includes a low pressure compressor driven by the fan drive turbine. A gear reduction includes a sun gear. The sun gear has teeth at an outer periphery. The sun gear engages a plurality of planet gears having teeth at an outer periphery. The sun gear is driven by the fan drive turbine. The planet gears are mounted on a carrier, such that the planet gears can rotate a first direction when driven by the sun gear which rotates in a second direction opposed to the first direction. The planet gears are engaged with teeth on an inner periphery of a ring gear. The ring gear is fixed against rotation such that rotation of the sun gear in the second direction causes rotation of the planet gears in the first direction to in turn cause rotation of the carrier. There are spray bars positioned circumferentially between adjacent ones of the planet gears, with the circumferential directions defined about a central axis of the sun gear. A radially inner face of the spray bar has jet openings communicating with an inlet plenum, such that lubricant can be passed outwardly of the jet openings from the inlet plenum and directly onto the teeth on the sun gear. A pair of side faces on sides of the radially inner face and one of the side faces having a plurality of windows extending from the one of the side faces into a discharge plenum within the spray bars such that oil can be scavenged through the windows into the discharge plenum. There are side surfaces formed between spaced ones of the plurality of windows. The side surface does not have an opening to communicate with the discharge plenum. The carrier is connected to drive a fan rotor, such that the fan rotor rotates at a slower speed than does the fan drive turbine.

In another embodiment according to any of the previous embodiments, the radially inner face is contoured about a rotational axis of the sun gear, and the side faces are both contoured about a rotational axis of different ones of the planet gears.

In another embodiment according to any of the previous embodiments, the at least one of the side faces having a radially innermost extent. The windows have a radially innermost extent. The window radially innermost extents are spaced radially outwardly of the side face radially innermost extent.

In another embodiment according to any of the previous embodiments, the plurality of windows extending from the one of the side faces in a direction with a component which will be radially outward and in a direction that will have a component in a radially outward direction and with a circumferential direction spaced in the direction of rotation with an associated gear once the spray bar is in a gear reduction.

In another embodiment according to any of the previous embodiments, the at least one side having the contoured surface initially extending in a direction with a circumferential component in a first circumferential direction from the radially innermost extent. The radially innermost extent of the window is at a radial location beyond a point of inflection where the at least one of the side faces begins to extend in a direction having a circumferential component in an opposed circumferential direction opposed to the first circumferential direction. The circumferential direction is defined relative to the rotational axis of the sun gear.

In another embodiment according to any of the previous embodiments, the at least one side having the contoured surface initially extending in a direction with a circumferential component in a first circumferential direction from the radially innermost extent. The radially innermost extent of the window is at a radial location beyond a point of inflection where the at least one of the side faces begins to extend in a direction having a circumferential component in an opposed circumferential direction opposed to the first circumferential direction. The circumferential direction is defined relative to the rotational axis of the sun gear.

In another embodiment according to any of the previous embodiments, the low pressure compressor rotates at the same speed as the fan drive turbine.

In another featured embodiment, a spray bar for use in a gear reduction to be associated with a gas turbine engine includes a radially inner face having jet openings communicating with an inlet plenum, such that lubricant can be passed outwardly of the jet openings from the inlet plenum. A pair of side faces on sides of the radially inner face and one of the side faces having a plurality of windows extending from the one of the side faces into a discharge plenum within the spray bar such that oil can be scavenged through the windows into the discharge plenum. There are side surfaces formed between the spaced windows. The side surfaces do not have an opening to communicate with the discharge plenum.

In another embodiment according to any of the previous embodiments, the radially inner face is contoured about a first axis spaced away from the spray bar. The side faces are both contoured about respective second and third axes spaced away from the spray bar.

In another embodiment according to any of the previous embodiments, the at least one of the side faces have a radially innermost extent. The windows have a radially innermost extent. The window radially innermost extents are spaced radially outwardly of the side face radially innermost extent.

In another embodiment according to any of the previous embodiments, the plurality of windows extending from the one of the side faces in a direction with a component which will be radially outward and in a direction that will have a component in a radially outward direction and with a circumferential direction spaced in the direction of rotation with an associated gear once the spray bar is in a gear reduction.

In another embodiment according to any of the previous embodiments, the at least one of the faces side having the contoured surface initially extending in a direction with a circumferential component in a first circumferential direction from the radially innermost extent. The radially innermost extent of the window is at a radial location beyond a point of inflection where the at least one of the side faces begins to extend in a direction having a circumferential component in an opposed circumferential direction opposed to the first circumferential direction, with the circumferential direction defined relative to the first axis.

These and other features of the present invention can be best understood from the following specification and drawings, the following of which is a brief description.

DETAILED DESCRIPTION

Figure 1:
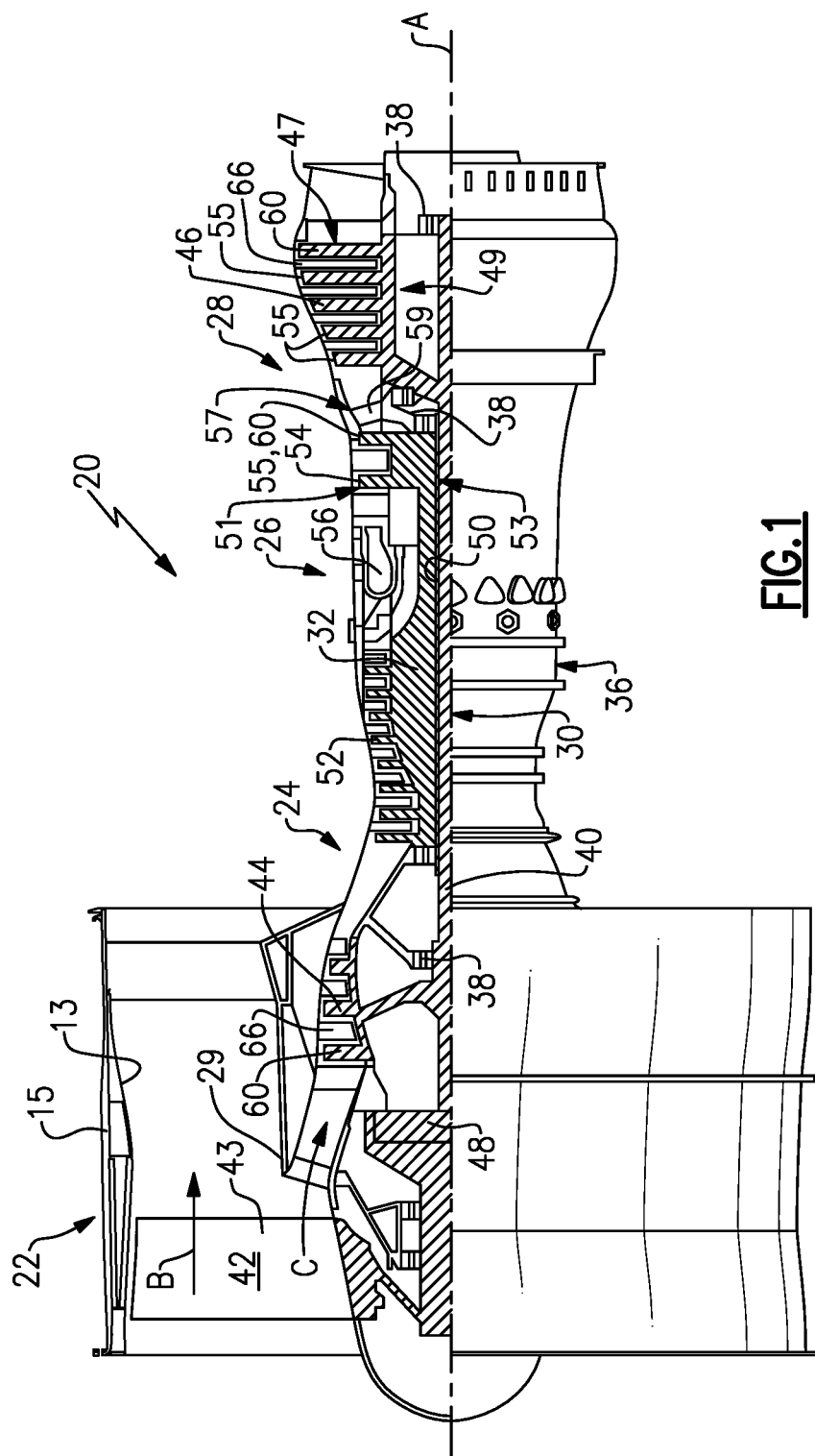
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 may drive both the fan 42 and low pressure compressor 44 through the geared architecture 48 such that the fan 42 and low pressure compressor 44 are rotatable at a common speed. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } °R)/(518.7 °R)]^{0.5}$. The corrected fan tip speed can be less than or equal to 1150.0 ft/second (350.5 meters/second), and can be greater than or equal to 1000.0 ft/second (304.8 meters/second).

Figure 2:
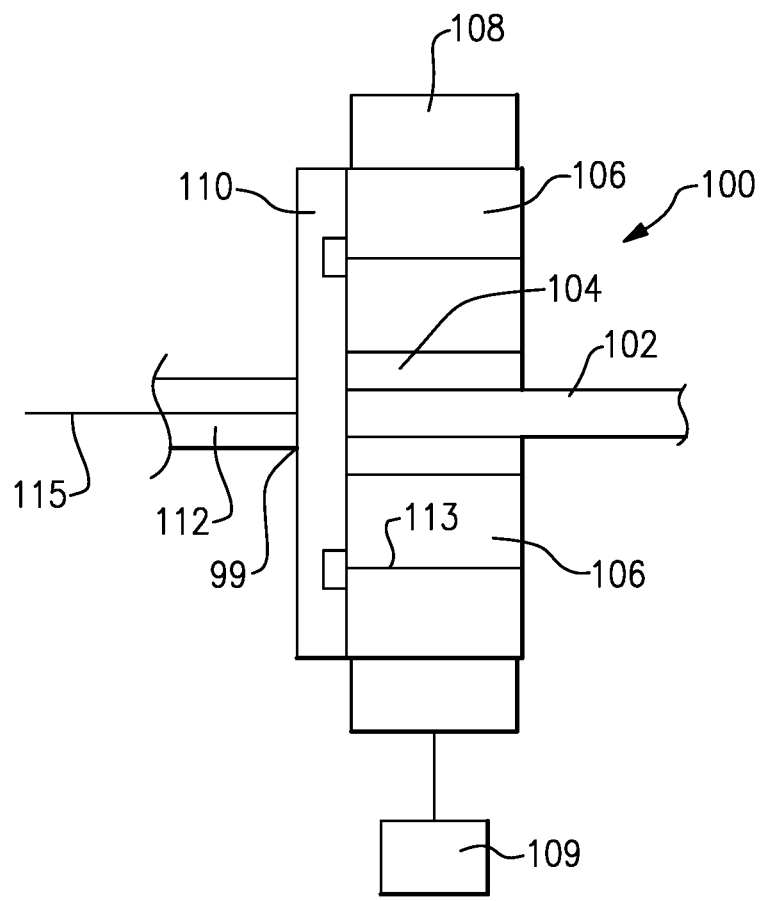
FIG. 2 is a highly schematic view of a planet gear reduction system.

The features of this disclosure will be discussed with regard to a gear reduction 100 shown in FIG. 2 to be incorporated into an engine such as shown in FIG. 1. In gear reduction 100 a shaft 102 drives a sun gear 104. Shaft 102 may be flexible. Sun gear 104 meshes with a plurality of planet gears 106. Gears 106 are planet gears, and have teeth engaged between teeth on sun gear 104 and teeth on a ring gear 108. Ring gear 108 is fixed to static structure, as shown schematically at 109. The planet gears 106 rotate with a carrier 110, which in turn drives shaft 112, which drives a fan rotor. A joint 99, shown schematically, connects the carrier to the shaft 112. As known, the planet gears 106 rotate about a central axis 113, but also are carried to rotate about a central axis 115 of the shaft 112 by the carrier 110. Challenges are raised because lubricant needs to be supplied to an interface between the planet gears 106 and a sun gear 104 and the lubricant supply device must rotate with the carrier 110.

Figure 3:
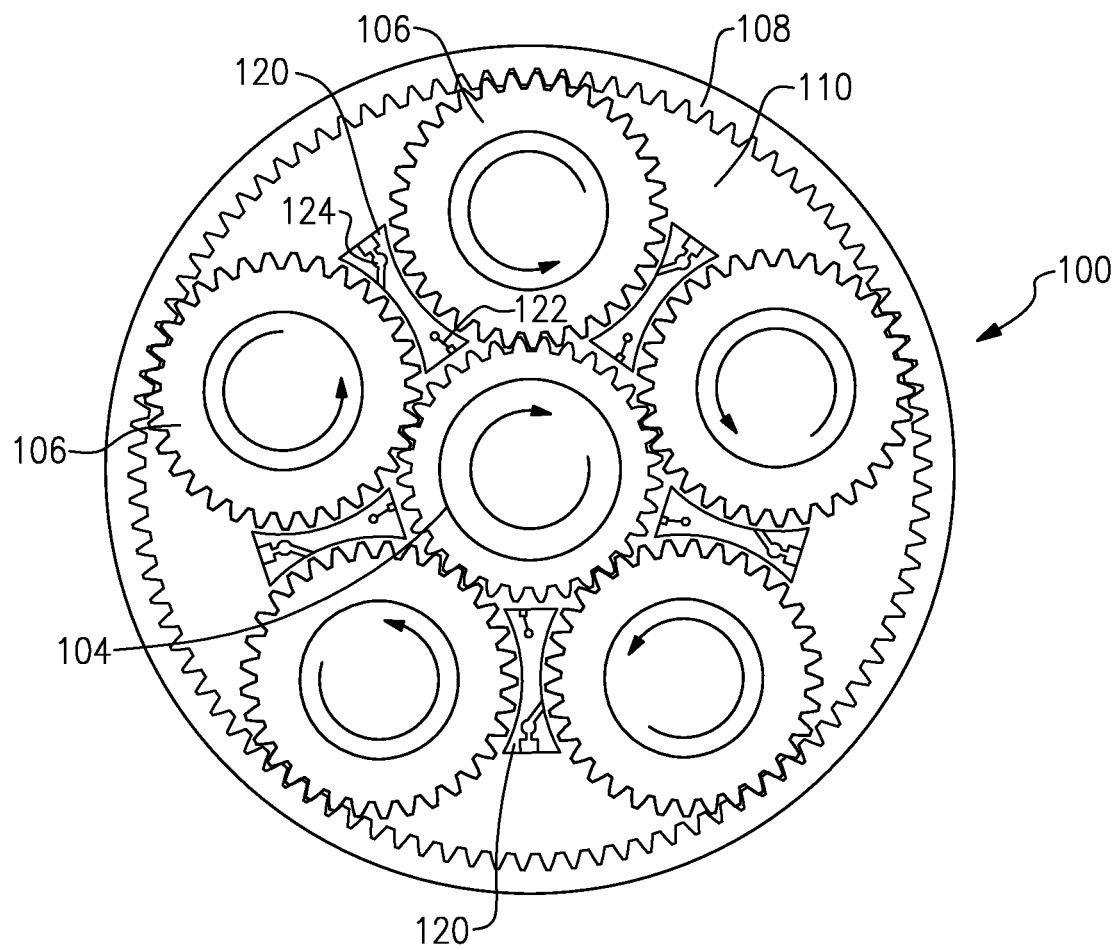
FIG. 3 shows details of the gears within the gear reduction of FIG. 2.

As shown in FIG. 3, the planet gears 106 are rotating counter clockwise, while the sun gear 104 rotates clockwise. Of course, this depends on perspective, but the gear 106 rotate in an opposed direction compared to gear 104. The carrier 110 will rotate in the same direction as the sun gear. As noted above, the ring gear 108 is fixed against rotation. A plurality of spray bars 120 are placed circumferentially between each planet gear 106. Spray bars 120 have a jet 122 supplying oil onto the teeth of the sun gear 104 upstream of when it will mesh with the teeth of the planet gear 106.

A scavenge window 124 is formed at a radially outer location on the spray bar 120 and will capture oil from a distinct planet gear 106 from that to which its jets 122 have provided lubricant.

Figure 4:
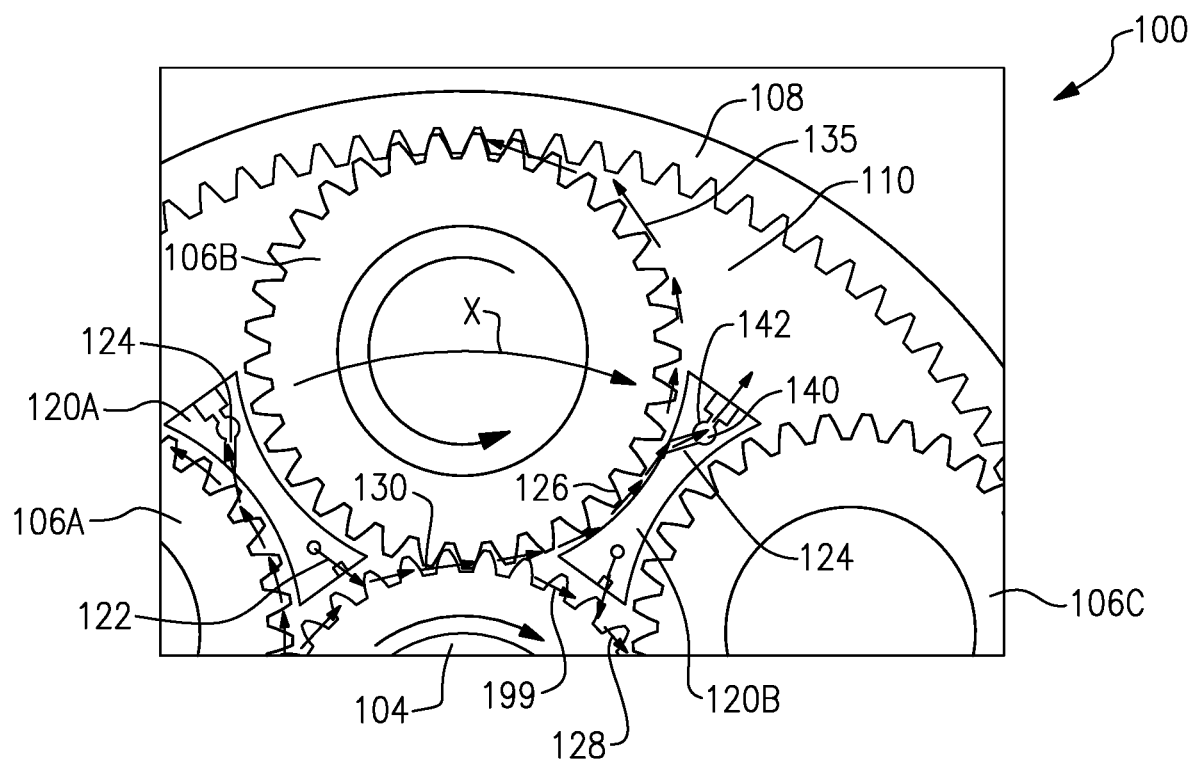
FIG. 4 shows a detail of the lubricant flowing to one of the interfaces between a planet gear and a sun gear.

FIG. 4 shows details of this lubricant supply. Lubricant is shown jetting out of jets 122 onto teeth on the sun gear 104 upstream of a location where the teeth on the sun gear 104 will mesh with the teeth on the planet gear 106. That is, each spray bar 120 directs oil radially inwardly directly onto sun gear 104. The spray bar 120A shown jetting oil at 122 also has windows 124 scavenging oil from a planet gear 106A downstream of the location where it has already moved out of engagement with the sun gear 104. The flow from the jet 122 is shown at 130, and continues until it encounters the next spray bar 120B in the direction of rotation of the planet gear 106B. It then reaches window 124 of spray bar 120B. As shown, there is lubricant recirculated at 199 which does not continue onto the spray bar 120, but rather moves circumferentially to supply lubricant for cooling between the sun gear 104 and yet another planet gear 106C.

At a location downstream of the inner face of the spray bar 120B or 120A where the jets 122 are located, there is window 124 which is formed at an angle extending radially outwardly, but in a direction with the component in the direction of rotation of the planet gear 106 such that the oil is captured in the window 124 and delivered into a plenum 142.

Another portion of this oil 135 is delivered downstream, without passing into the window 124 such that it can lubricant an interface between the teeth of the planet gear 106 and the ring gear 108.

Figure 5A:
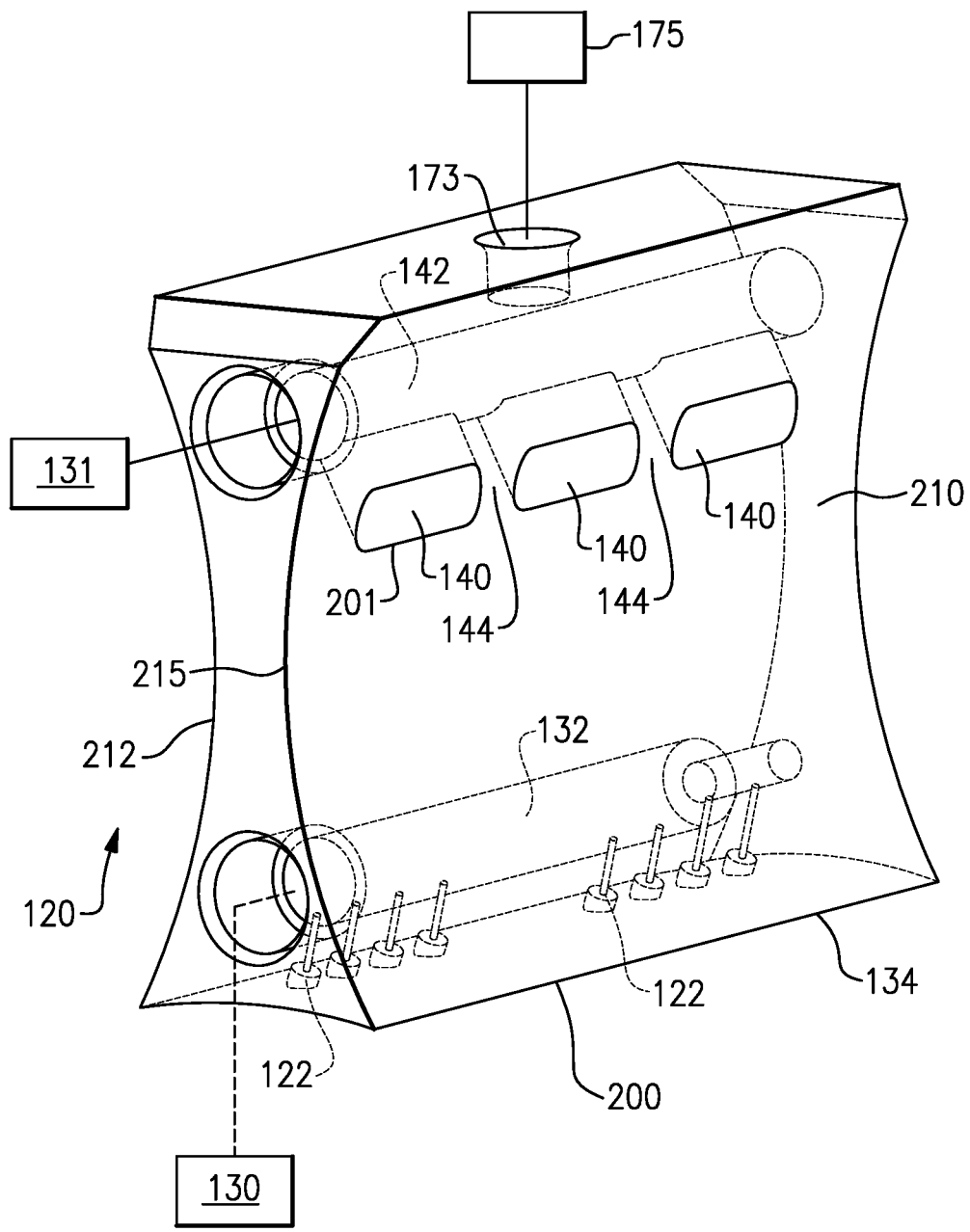
FIG. 5A shows a detail of a spray bar.

FIG. 5A shows detail of the spray bar 120. As shown, a supply 130 delivers oil into a supply plenum 132, where it communicates with the jets 122. As can be appreciated, an inner face 134 of the spray bar 120, and side surfaces 210 and 212, are each curved. The inner surface 134 is curved somewhat about an axis of rotation of the sun gear 104, while the side surfaces 210 and 212 are curved about an axis of rotation of adjacent planet gears 106, such that they can closely surround an outer periphery of the sun gear, and planet gears 106, respectively.

The windows 140 are shown being circumferentially spaced by areas 144 without an opening. The areas 144 ensure an adequate flow of lubricant to the path 135 as shown in FIG. 4. The windows 140 communicate with a plenum 142 which is delivered to a use 131 and 175. The use may preferably be a use that requires less cooling than the inner face between the sun gears and the planet gears, such as joint lubrication, an auxiliary oil system for cooling other less demanding areas such as bearings, or it may simply be redirected to an oil sump.

A tap 173 communicates with plenum 142 and delivers returning oil to a use 175. In one embodiment, the use 175 receiving the oil from tap 173 may be joint 99.

As shown in FIG. 5A, there is a radially inner end 200 of the spray bar 120, and defined by the inner face 134. Jets 122 extend to the radially inner end 200, and outwardly of the face 134. On the other hand, a radially innermost end 201 of the window 140 is spaced from the radially inner end 200 of the spray bar 120. In fact, the inner end 201 of the window 140 is spaced beyond the point of inflection 215 where the side surface has now began to be formed having the component in a circumferential direction extending away from the circumferential direction found at inner end 200 (circumferential direction being defined by the center axis of the sun gear 104).

Figure 5B:
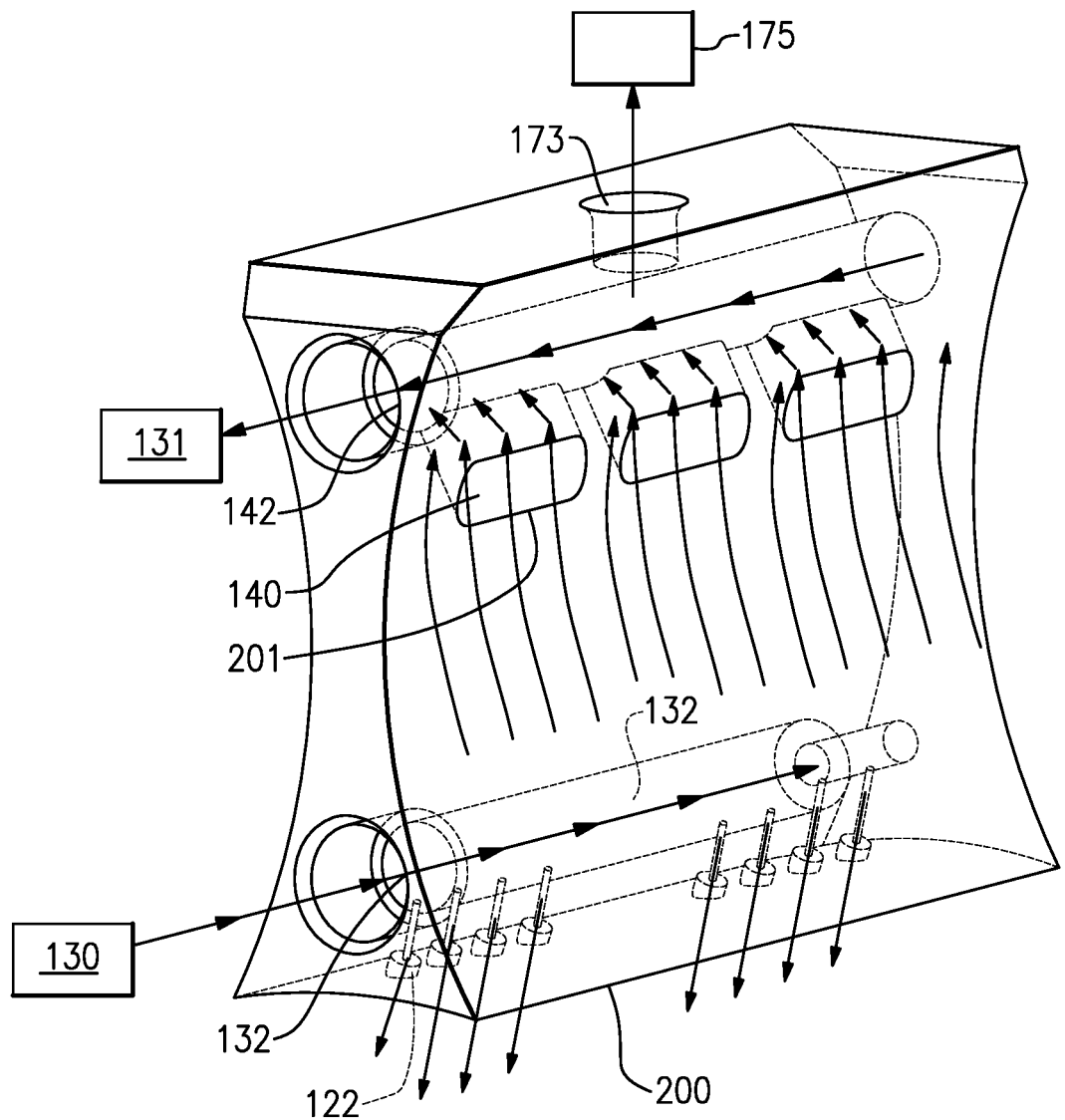
FIG. 5B is a view similar to FIG. 5A, however, showing the flow of lubricant through the spray bar.

As shown in FIG. 5B, oil is supplied from supply 130 into plenum 132 and then outwardly through jets 122. Oil is captured in windows 140 and delivered into the plenum 142 where it may then be supplied to the uses 131 and 175.

Figure 5C:
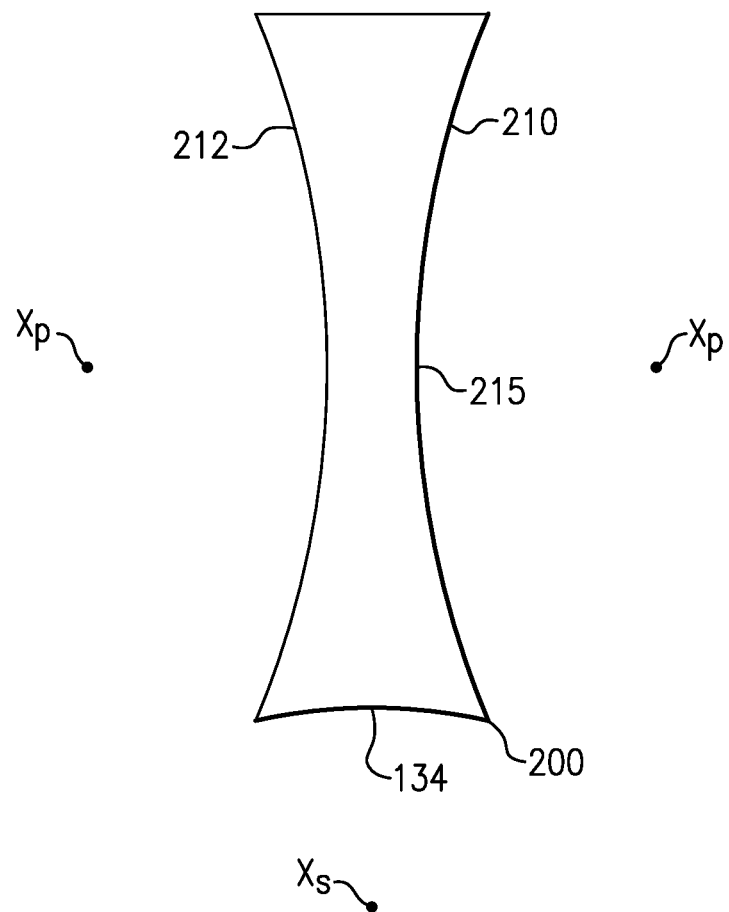
FIG. 5C schematically shows a side view of a spray bar.

As shown in FIG. 5C, the side walls 210 and 212 are each curved about an axis $X_p$, which may be the rotational axis of an adjacent planet gear. As can be appreciated, the side faces are curved about a rotational axis of different ones of said planet gears. Similarly, inner face 134 is curved about an axis $X_s$ which may be the rotational axis of the sun gear.

While curved surfaces are shown, the sides 210 and 212 and inner face 134 may instead be simply contoured about the respective axes X. That is, the surfaces could be faceted, having a number of straight sections, but the totality of sections changing direction such that the surfaces are effectively contoured about an axis spaced away from the respective surfaces.

In that sense, one could say that the side faces have a contoured surface initially extending in a direction with a circumferential component in a first circumferential direction from a radially innermost extent. A radially innermost extent of the windows is at a radial location beyond a point of inflection 215 where the side faces begin to extend in a direction having a circumferential component in an opposed circumferential direction to the circumferential direction, with the "circumferential direction" defined relative to the sun gear rotational axis $X_s$.

The spray bar with a scavenge system as disclosed herein utilizes cool oil from source 130, scavenges oil having been heated by the several gears, and uses that heated oil for less challenging functions downstream of the spray bar 120, and at uses 131 and 175.

The present disclosure provides a spray bar system that results in efficient lubrication, cooling and handling of lubricant supply to a planet gear system for driving a fan and a gas turbine engine.

A gear reduction for use in a gas turbine engine under this disclosure could be said to include a sun gear having teeth at an outer periphery. The sun gear engages a plurality of planet gears having teeth at an outer periphery. The planet gears are mounted on a carrier, such that the planet gears can rotate in a first direction when driven by the sun gear which rotates in a second direction opposed to the first direction. The planet gears are engaged with teeth on an inner periphery of a ring gear. The ring gear is fixed against rotation such that rotation of the sun gear in the second direction causes rotation of the planet gears in the first direction to in turn cause rotation of the carrier. There are spray bars positioned circumferentially between adjacent ones of the planet gears. The circumferential directions are defined about a central axis of the sun gear. Radially inner face of the spray bars have jet openings communicating with an inlet plenum, such that lubricant can be passed outwardly of the jet openings from the inlet plenum and directly onto the teeth on the sun gear. There are a pair of side faces on sides of the radially inner face. One of the side faces has a plurality of windows extending into a discharge plenum within said spray bar such that oil can be scavenged through the windows into the discharge plenum. There are side surfaces formed between spaced ones of the plurality of windows. The side surfaces do not have an opening to communicate with the discharge plenum.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gear reduction for use in a gas turbine engine comprising:
   a sun gear, said sun gear having teeth at an outer periphery, said sun gear engaging a plurality of planet gears having teeth at an outer periphery;
   said planet gears mounted on a carrier, such that said planet gears can rotate in a first direction when driven by said sun gear which rotates in a second direction opposed to said first direction, and said planet gears engaged with teeth on an inner periphery of a ring gear, said ring gear being fixed against rotation such that rotation of said sun gear in said second direction causes rotation of said planet gears in said first direction to in turn cause rotation of said carrier; and
   there being spray bars positioned circumferentially between adjacent ones of said planet gears, with the circumferential directions defined about a central axis of said sun gear;
   a radially inner face of said spray bars having jet openings communicating with an inlet plenum, such that lubricant can be passed outwardly of said jet openings from the inlet plenum and directly onto said teeth on said sun gear;
   a pair of side faces on sides of said radially inner face and one of said side faces having a plurality of windows extending from said one of said side faces into a discharge plenum within said spray bar such that oil can be scavenged through said windows into said discharge plenum, and there being side surfaces formed between spaced ones of said plurality of windows wherein said side surfaces do not have an opening to communicate with said discharge plenum;
   wherein said at least one of said side faces having a radially innermost extent, and said plurality of windows having a radially innermost extent, and said window radially innermost extents being spaced radially outwardly of said side face radially innermost extent; and
   wherein said at least one of said side faces having said contoured surface initially extending in a direction with a circumferential component in a first circumferential direction from said radially innermost extent, and said radially innermost extent of said window being at a radial location beyond a point of inflection where said at least one of said side faces begins to extend in a direction having a circumferential component in an opposed circumferential direction the first circumferential direction, with the circumferential direction defined relative to said rotational axis of said sun gear.

2. The gear reduction as set forth in claim 1, wherein said radially inner face is contoured about a rotational axis of said sun gear, and said side faces are both contoured about a rotational axis of different ones of said planet gears.

3. A gas turbine engine comprising:
   a turbine section including a propulsor drive turbine;
   a compressor section including a low pressure compressor driven by said propulsor drive turbine;
   a gear reduction including a sun gear, said sun gear having teeth at an outer periphery, said sun gear engaging a plurality of planet gears having teeth at an outer periphery, said sun gear driven by said propulsor drive turbine;
   said planet gears mounted on a carrier, such that said planet gears can rotate a first direction when driven by said sun gear which rotates in a second direction opposed to said first direction, and said planet gears engaged with teeth on an inner periphery of a ring gear, said ring gear being fixed against rotation such that rotation of said sun gear in said second direction causes rotation of said planet gears in said first direction to in turn cause rotation of said carrier;
   there being spray bars positioned circumferentially between adjacent ones of said planet gears, with the circumferential directions defined about a central axis of said sun gear;
   a radially inner face of said spray bar having jet openings communicating with an inlet plenum, such that lubricant can be passed outwardly of said jet openings from the inlet plenum and directly onto said teeth on said sun gear;
   a pair of side faces on sides of said radially inner face and one of said side faces having a plurality of windows extending from said one of said side faces into a discharge plenum within said spray bars such that oil can be scavenged through said windows into said discharge plenum, and there being side surfaces formed between spaced ones of said plurality of windows wherein said side surface do not have an opening to communicate with said discharge plenum;
   said carrier being connected to drive a propulsor rotor, such that said propulsor rotor rotates at a slower speed than does said propulsor drive turbine;
   a propulsor drive turbine pressure ratio being greater than or equal to 8.0 and less than or equal to 13.0, with said propulsor pressure ratio defined as a pressure measured prior to an inlet of said propulsor drive turbine as related to a pressure at an outlet of the propulsor drive turbine prior to an exhaust nozzle, with said propulsor ratio measured at a cruise condition of an associated aircraft;

wherein said radially inner face is contoured about a rotational axis of said sun gear, and said side faces are both contoured about a rotational axis of different ones of said planet gears; and wherein said at least one of said side faces having a radially innermost extent, and said windows having a radially innermost extent, and said window radially innermost extents being spaced radially outwardly of said side face radially innermost extent.

4. The gas turbine engine as set forth in claim 3, wherein said plurality of windows extending from said one of said side faces in a direction with a component which will be radially outward and in a direction that will have a component in a radially outward direction and with a circumferential direction spaced in the direction of rotation with an associated gear once said spray bar is in a gear reduction.

5. The gas turbine engine as set forth in claim 3, wherein said at least one side having said contoured surface initially extending in a direction with a circumferential component in a first circumferential direction from said radially innermost extent, and said radially innermost extent of said window being at a radial location beyond a point of inflection where said at least one of said side faces begins to extend in a direction having a circumferential component in an opposed circumferential direction opposed to the first circumferential direction, with the circumferential direction defined relative to the rotational axis of the sun gear.

6. The gas turbine engine as set forth in claim 3, wherein said low pressure compressor rotates at the same speed as the propulsor drive turbine.

7. A gas turbine engine comprising:
a turbine section including a propulsor drive turbine;
a compressor section including a low pressure compressor driven by said propulsor drive turbine;
a gear reduction including a sun gear, said sun gear having teeth at an outer periphery, said sun gear engaging a plurality of planet gears having teeth at an outer periphery, said sun gear driven by said propulsor drive turbine;
said planet gears mounted on a carrier, such that said planet gears can rotate a first direction when driven by said sun gear which rotates in a second direction opposed to said first direction, and said planet gears engaged with teeth on an inner periphery of a ring gear, said ring gear being fixed against rotation such that rotation of said sun gear in said second direction causes rotation of said planet gears in said first direction to in turn cause rotation of said carrier;

there being spray bars positioned circumferentially between adjacent ones of said planet gears, with the circumferential directions defined about a central axis of said sun gear;

a radially inner face of said spray bar having jet openings communicating with an inlet plenum, such that lubricant can be passed outwardly of said jet openings from the inlet plenum and directly onto said teeth on said sun gear;

a pair of side faces on sides of said radially inner face and one of said side faces having a plurality of windows extending from said one of said side faces into a discharge plenum within said spray bars such that oil can be scavenged through said windows into said discharge plenum, and there being side surfaces formed between spaced ones of said plurality of windows wherein said side surface do not have an opening to communicate with said discharge plenum;

said carrier being connected to drive a propulsor rotor, such that said propulsor rotor rotates at a slower speed than does said propulsor drive turbine;

a propulsor drive turbine pressure ratio being greater than or equal to 8.0 and less than or equal to 13.0, with said propulsor pressure ratio defined as a pressure measured prior to an inlet of said propulsor drive turbine as related to a pressure at an outlet of the propulsor drive turbine prior to an exhaust nozzle, with said propulsor ratio measured at a cruise condition of an associated aircraft; and wherein said at least one side having said contoured surface initially extending in a direction with a circumferential component in a first circumferential direction from said radially innermost extent, and said radially innermost extent of said window being at a radial location beyond a point of inflection where said at least one of said side faces begins to extend in a direction having a circumferential component in an opposed circumferential direction opposed to the first circumferential direction, with the circumferential direction defined relative to the rotational axis of the sun gear.

8. The gas turbine engine as set forth in claim 7, wherein said radially inner face is contoured about a rotational axis of said sun gear, and said side faces are both contoured about a rotational axis of different ones of said planet gears.

9. The gas turbine engine as set forth in claim 8, wherein said at least one of said side faces having a radially innermost extent, and said windows having a radially innermost extent, and said window radially innermost extents being spaced radially outwardly of said side face radially innermost extent.

* * * * *